(12) United States Patent
Macaraeg, Jr.

(10) Patent No.: US 10,099,769 B2
(45) Date of Patent: Oct. 16, 2018

(54) DOOR ALIGNMENT SYSTEM

(71) Applicant: The Boeing Company, Chicago, IL (US)

(72) Inventor: Peter Macaraeg, Jr., St. Louis, MO (US)

(73) Assignee: The Boeing Company, Chicago, IL (US)

( * ) Notice: Subject to any disclaimer, the term of this patent is extended or adjusted under 35 U.S.C. 154(b) by 49 days.

(21) Appl. No.: 14/729,242

(22) Filed: Jun. 3, 2015

(65) Prior Publication Data

US 2016/0356078 A1 Dec. 8, 2016

(51) Int. Cl.
*B64C 1/14* (2006.01)
*E06B 3/36* (2006.01)

(52) U.S. Cl.
CPC ............ *B64C 1/1461* (2013.01); *E06B 3/362* (2013.01); *E06B 3/365* (2013.01)

(58) Field of Classification Search
CPC . E06B 7/16; E06B 3/365; E06B 3/362; E05C 7/04; E05C 7/06; B64C 1/1461; B64C 1/1415; B64D 1/06
USPC .......................................... 49/366, 367, 368
See application file for complete search history.

(56) References Cited

U.S. PATENT DOCUMENTS

| | | | | |
|---|---|---|---|---|
| 2,566,578 A | * | 9/1951 | Minor ....................... | E05C 7/06 220/324 |
| 2,933,784 A | * | 4/1960 | Hooverson ........... | E06B 7/2309 292/74 |
| 3,590,531 A | * | 7/1971 | Childs ....................... | E06B 7/20 49/368 |
| 3,811,643 A | * | 5/1974 | Pizzo .................... | B64C 1/1469 244/1 R |
| 3,940,886 A | * | 3/1976 | Ellingson, Jr. ...... | E05B 65/1013 292/92 |
| 4,395,000 A | | 7/1983 | Deviny et al. | |
| 4,428,153 A | * | 1/1984 | Klinger ................. | E05C 19/002 49/310 |
| 5,349,782 A | * | 9/1994 | Yulkowski ............ | E05C 19/002 49/366 |
| 5,581,946 A | * | 12/1996 | Lin ........................ | E05C 19/001 49/368 |
| 5,803,405 A | * | 9/1998 | Ellis ......................... | B64D 1/06 244/118.1 |
| 5,823,473 A | | 10/1998 | Odell et al. | |
| 5,930,955 A | * | 8/1999 | Biebuyck ................ | E06B 3/362 49/366 |

(Continued)

*Primary Examiner* — Gregory J Strimbu
(74) *Attorney, Agent, or Firm* — Walters & Wasylyna LLC

(57) ABSTRACT

A door alignment system may include a door assembly including a first door and a second door, a striker assembly configured to positively align a first mating edge of the first door and a second mating edge of the second door when the first door and the second door are moved into a closed position, the striker assembly including a striker coupled to the first mating edge and a striker receptacle coupled to the second mating edge and configured to receive the striker, and a rail assembly configured to maintain alignment of the first mating edge and the second mating edge when the first door and the second door are in the closed position, the rail assembly including a convex first rail coupled to the first mating edge and a concave second rail coupled to the second mating edge and configured to engage the convex first rail.

20 Claims, 12 Drawing Sheets

(56) References Cited

U.S. PATENT DOCUMENTS

| | | | |
|---|---|---|---|
| 8,850,747 B2* | 10/2014 | Dries | E06B 7/22 49/383 |
| 2015/0266561 A1* | 9/2015 | Hariram | B64C 1/1407 49/475.1 |

* cited by examiner

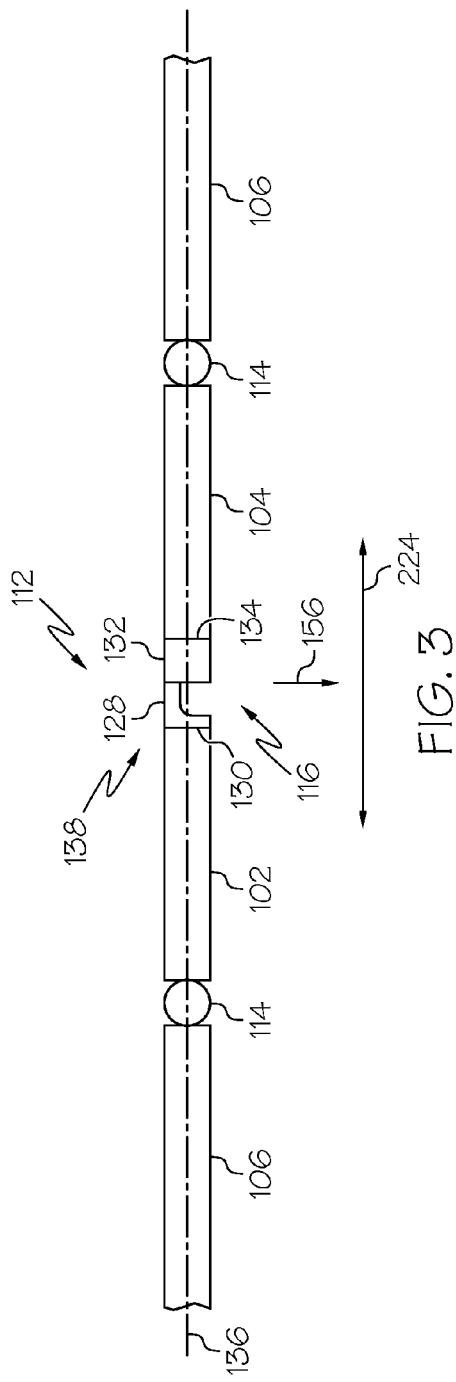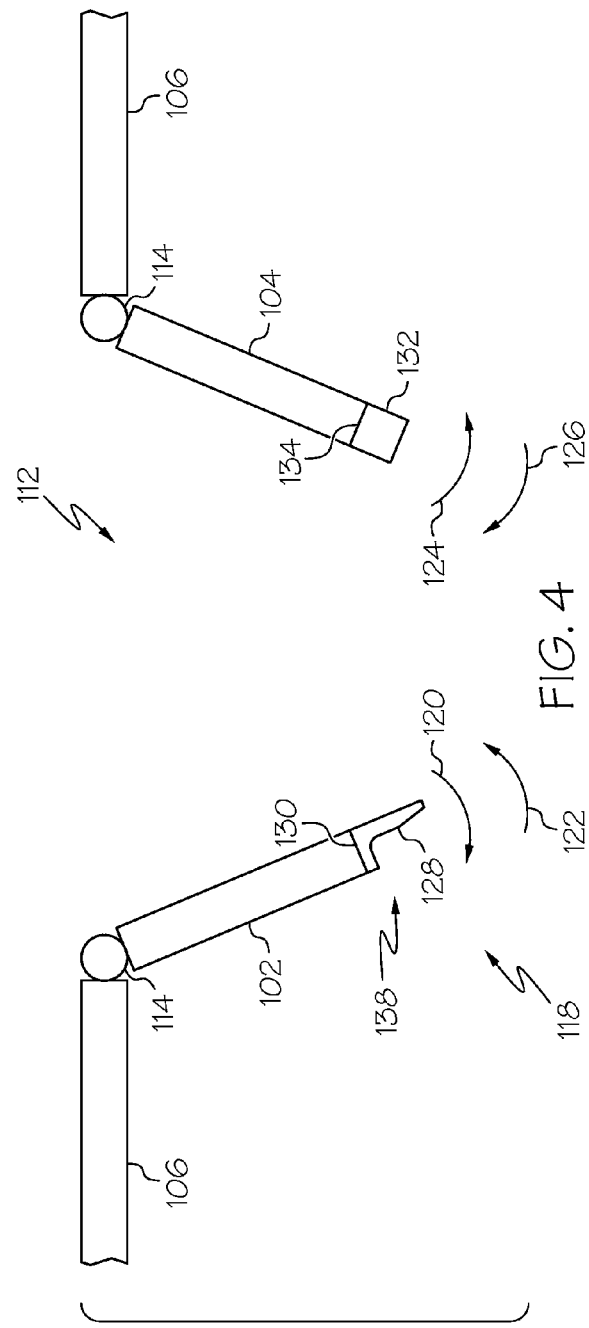

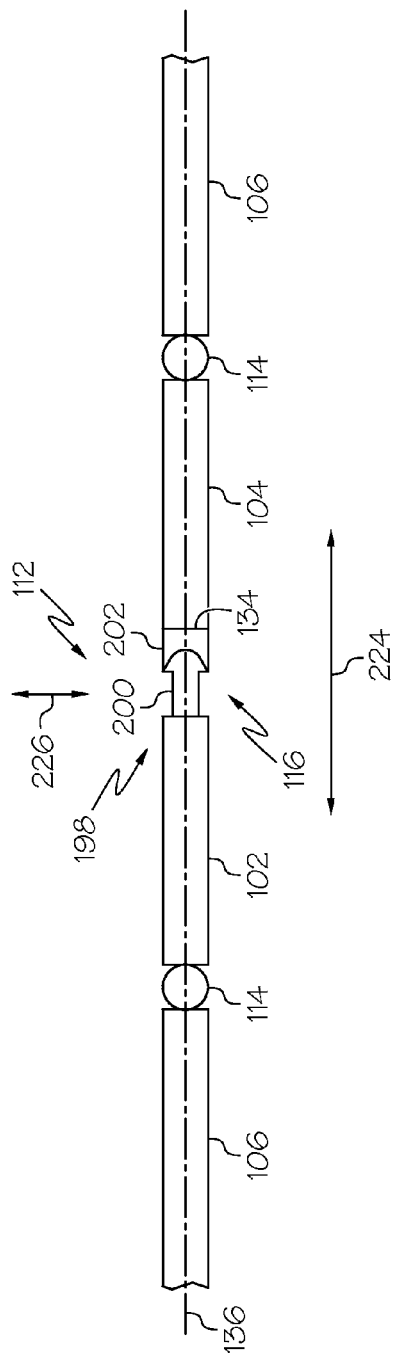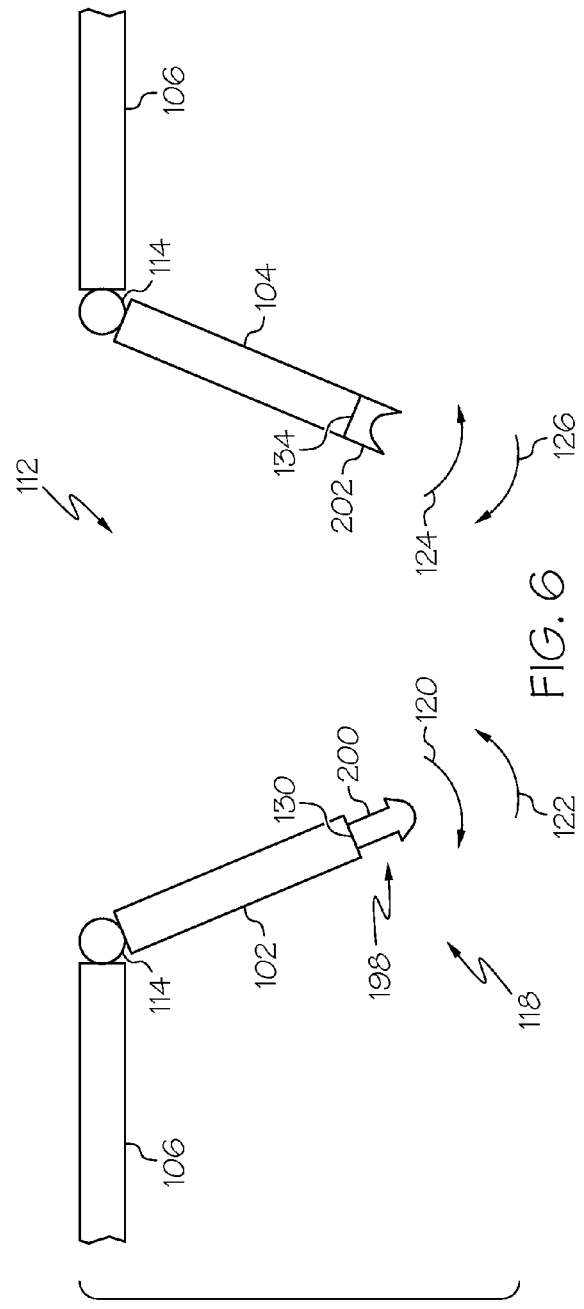

DOOR ALIGNMENT SYSTEM

FIELD

The present disclosure is generally related to door assemblies and, more particularly, to systems and methods for positively aligning and maintaining alignment of door edges.

BACKGROUND

In some door installations, movable doors may require relatively precision door edge-to-door edge positioning as the doors are moved to their closed positions. As one example, some movable doors may incorporate door-joint sealing components and proper door edge-to-door edge alignment and positioning may be required to ensure proper engagement of interior or exterior surface mounted seal components. In door installations where no door edge-to-door edge position alignment mechanism is incorporated, edges of the doors may become misaligned during a closing operation or cycle.

Misalignment of door edges may result in improper seal engagement, damage to seal components during the door closing operation and/or failure of the door seal components. Improper mechanical positioning of the edges, for example, due to door flexure, door drive tolerances, etc. may cause such misalignment of door edges.

Accordingly, those skilled in the art continue with research and development efforts in the field of edge alignment during closure of movable doors.

SUMMARY

In one embodiment, the disclosed door alignment system may include a door assembly including a first door including a first mating edge and a second door including a second mating edge, wherein the first door and the second door are movable to a closed position, a striker assembly configured to positively align the first mating edge and the second mating edge when the first door and the second door are moved into the closed position, the striker assembly including a striker coupled to the first mating edge and a striker receptacle coupled to the second mating edge opposite the striker and configured to receive the striker, and a rail assembly configured to maintain alignment of the first mating edge and the second mating edge when the first door and the second door are in the closed position, the rail assembly including a convex first rail coupled to the first mating edge and a concave second rail coupled to the second mating edge opposite the convex first rail and configured to engage the convex first rail.

In another embodiment, the disclosed striker assembly for positively aligning a first mating edge of a first door and a second mating edge of a second door when the first door and the second door are moved into a closed position may include a striker arm projecting outwardly from the first mating edge of the first door, the striker arm including a first follower surface, a second follower surface extending at a non-zero angle from the first follower surface to an end of the striker arm, and an apex defined at an intersection of the first follower surface and the second follower surface, a follower mechanism movably coupled to the second mating edge of the second door, the follower mechanism including a cam configured to engage and move along the second follower surface to the first follower surface to guide the first mating edge of the first door and the second mating edge of the second door into alignment when the first door and the second door are moved into the closed position, and a lever coupled to the cam and configured to disengage the cam from the first follower surface upon engagement with the end of the striker arm when the first door and the second door are in the closed position.

In another embodiment, the disclosed rail assembly for maintaining alignment of a first mating edge of a first door and a second mating edge of a second door when the first door and the second door are in a closed position may include a first rail coupled to the first mating edge of the first door, the first rail including a convex head linearly movable relative to and biased outwardly from the first mating edge of the first door, and a second rail coupled to the second mating edge of the second door, the second rail including a concave head configured to matingly engage the convex head when the first door and the second door are in the closed position.

In yet another embodiment, the disclosed method for aligning a first mating edge of a first door and a second mating edge of a second door when the first door and the second door are moved into a closed position may include the steps of: (1) moving the first door and the second door from an opened position toward a closed position, (2) engaging a second follower surface of a striker arm projecting outwardly from the first mating edge of the first door with a cam of a follower mechanism movably coupled to the second mating edge of the second door, (3) positively aligning the first mating edge of the first door and the second mating edge of the second door by moving the cam along the second follower surface to a first follower surface disposed at a non-zero angle relative to the second follower surface, (4) separating the first mating edge of the first door from the second mating edge of the second door by engaging the cam to an apex of the striker arm formed by an intersection of the second follower surface and the first follower surface, (5) further aligning the first mating edge of the first door and the second mating edge of the second door by moving the cam along the first follower surface until the first door and the second door are in the closed position, (6) maintaining alignment of the first mating edge of the first door and the second mating edge of the second door by matingly engaging a convex first rail coupled to the first mating edge of the first door with a concave second rail coupled to the second mating edge of the second door when the first door and the second door are in the closed position, and (7) disengaging the cam from the first follower surface.

Other embodiments of the disclosed systems and method will become apparent from the following detailed description, the accompanying drawings and the appended claims.

BRIEF DESCRIPTION OF THE DRAWINGS

FIG. 3 is a partial schematic side elevational view of one embodiment of the disclosed door assembly and striker assembly of FIG. 1 depicted in a closed position;

FIG. 4 is a partial schematic side elevational view of the door assembly and striker assembly of FIG. 3 depicted in an opened position;

FIG. 5 is a partial schematic side elevational view of one embodiment of the disclosed door assembly and rail assembly of FIG. 1 depicted in a closed position;

FIG. 6 is a partial schematic side elevational view of the door assembly and rail assembly of FIG. 5 depicted in an opened position;

DETAILED DESCRIPTION

Figure 1:
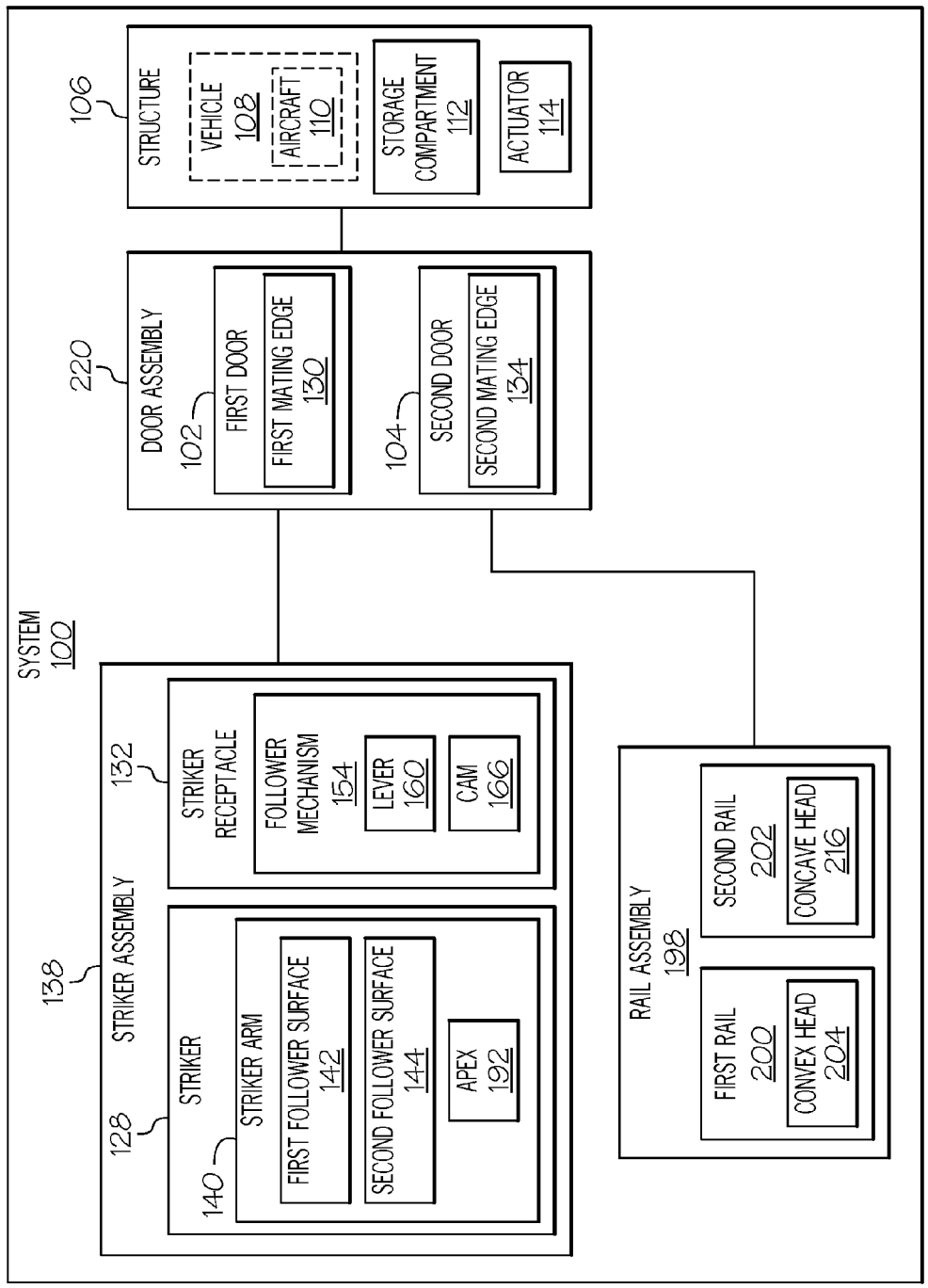
FIG. 1 is a schematic block diagram of one embodiment of the disclosed door alignment system.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Figure 19:
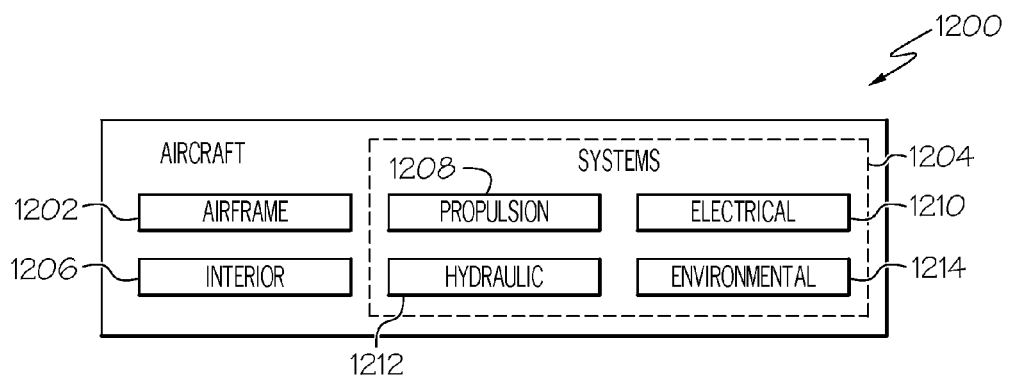
FIG. 19 is a schematic illustration of an aircraft.

In FIGS. 1 and 19, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1 and 19 may be combined in various ways without the need to include other features described in FIGS. 1 and 19, other drawing figures, and/or the accompanying disclosure, even though such combination or combinations are not explicitly illustrated herein. Similarly, additional features not limited to the examples presented, may be combined with some or all of the features shown and described herein.

Figure 17:
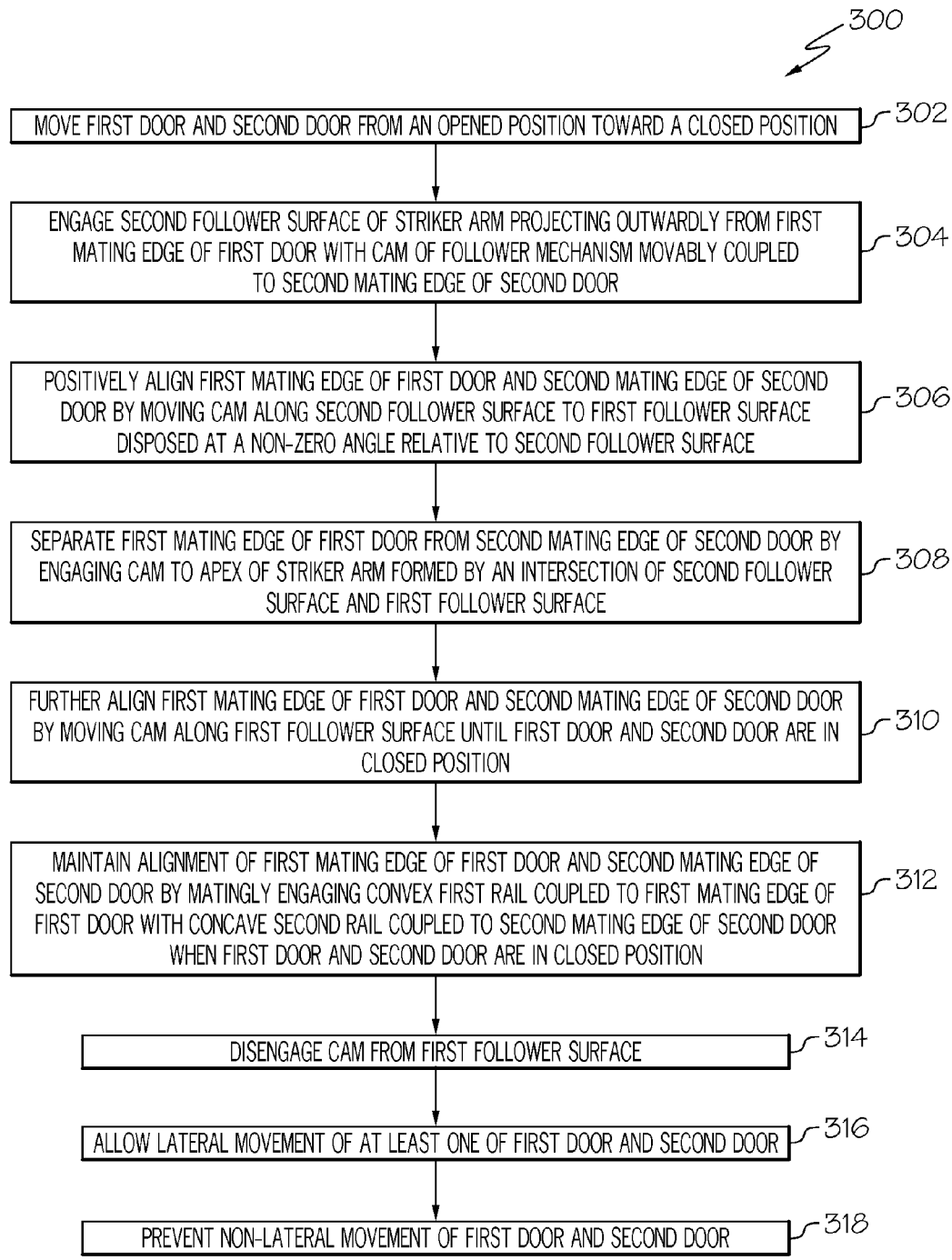
FIG. 17 is a flow diagram of one embodiment of the disclosed method for aligning a first mating edge of a first door and a second mating edge of a second door when the first door and the second door are moved into the closed position.
Figure 18:
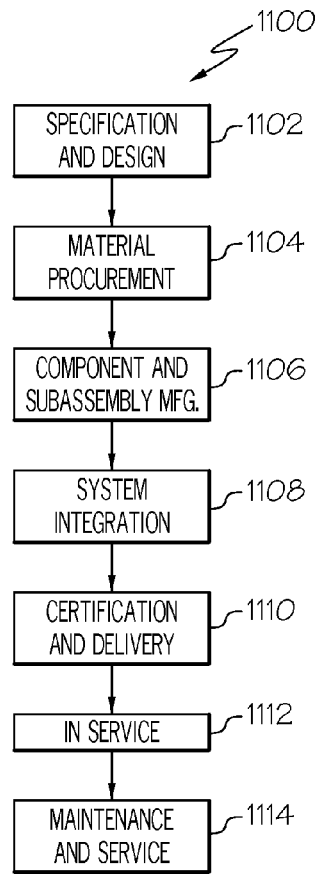
FIG. 18 is a block diagram of aircraft production and service methodology.

In FIGS. 17 and 18, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 17 and 18 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Reference herein to "example" means that one or more feature, structure, or characteristic described in connection with the example is included in at least one embodiment or implementation. The phrase "one example" or "another example" in various places in the specification may or may not be referring to the same example.

Referring to FIG. 1, and with reference to FIGS. 2-6, one embodiment of door alignment system, generally designated system 100, is disclosed. System 100 may include door assembly 220. Door assembly 220 may include first door 102 and second door 104. First door 102 and second door 104 may each be movably coupled to structure 106. As one example, first door 102 and second door 104 may be rotatably movable relative to structure 106. First door 102 and second door 104 may at least partially rotate relative to structure 106 between first (e.g., a closed) position 116, as illustrated in FIGS. 3 and 5, and second (e.g., an open) position 118, as illustrated in FIGS. 4 and 6.

As one non-limiting example, first door 102 and second door 104 may be hingedly coupled to structure 106. For example, first door 102 and second door 104 may rotate relative to structure 106 about a hinged connection (not explicitly identified).

Figure 7:
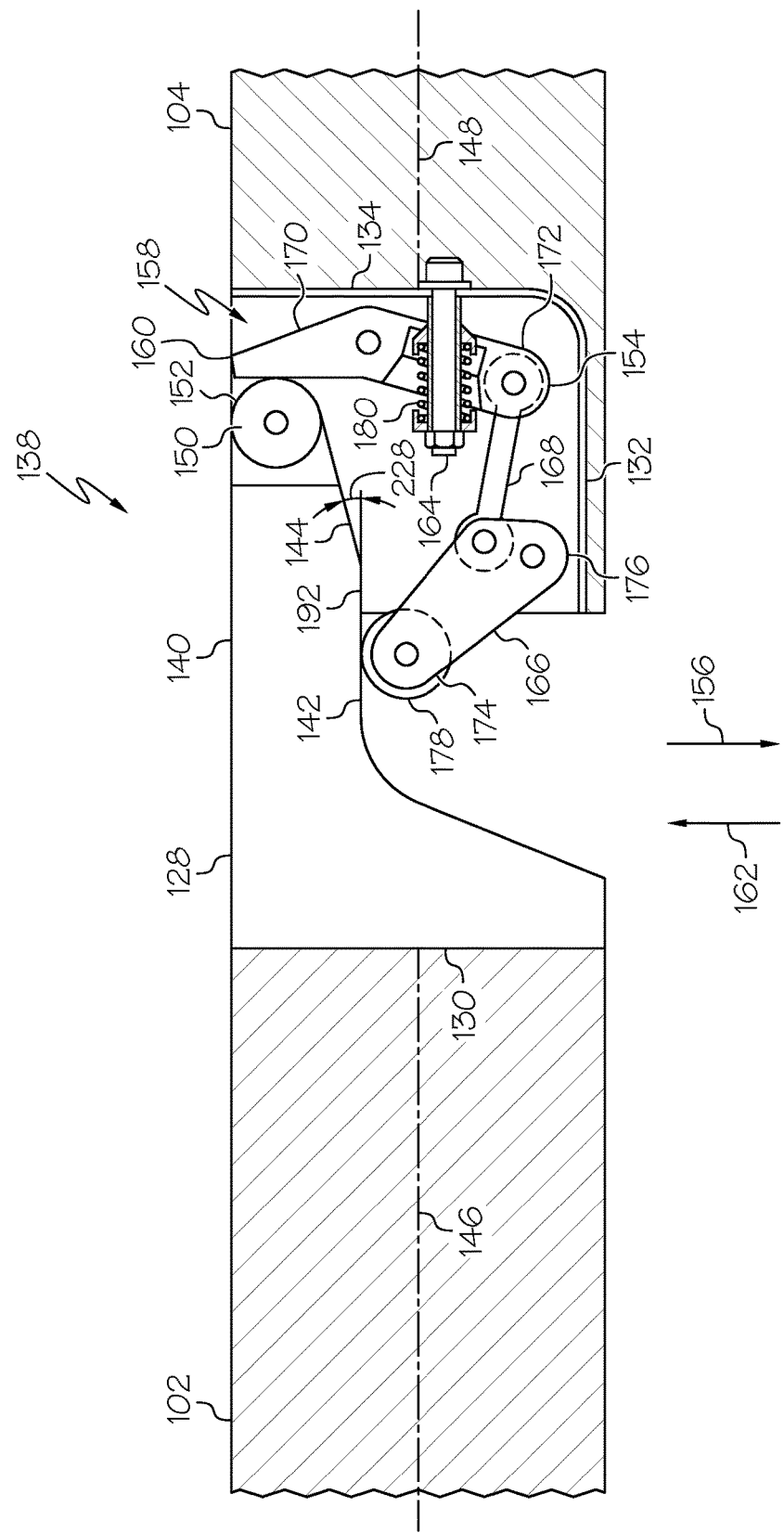
FIG. 7 is a schematic side elevational view, in section, of the striker assembly of FIG. 2.
Figure 8:
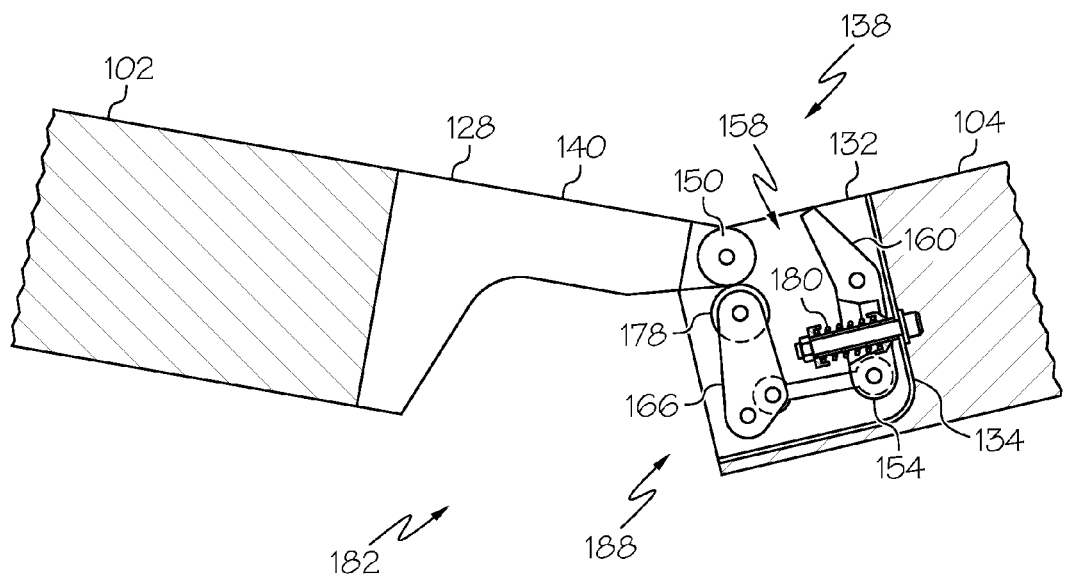
FIG. 8 is a schematic side elevational view, in section, of the striker assembly of FIG. 7 depicting the door assembly moving into the closed position.

Referring to FIGS. 3 and 5, and with reference to FIGS. 7 and 8, when in the fully closed first position 116, first mating edge 130 of first door 102 and second mating edge 134 of second door 104 may be joined together and first door 102 and second door 104 may be coaxially aligned along a common plane 136 (FIGS. 3 and 5). Common plane 136 may be a virtual plane shared by a virtual first plane 146 (FIGS. 7 and 8) extending through first door 102 and a virtual second plane 148 (FIGS. 7 and 8) extending through second door 104 when first door 102 and second door 104 are in first position 116. While first plane 146 is illustrated as extending centrally through first door 102 and second plane 148 is illustrated as extending centrally through second door 104, first plane 146 and second plane 148 may be located at other locations along a cross-sectional thickness dimension of first door 102 and second door 104, respectively.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

Structure 106 may include storage compartment 112. Storage compartment 112 may be located within an interior volume of structure 106. As one example, storage compartment 112 may be configured (e.g., suitably sized) to store cargo (not explicitly illustrated). When closed (e.g., when in first position 116) (FIGS. 3 and 5), first door 102 and second door 104 may enclose storage compartment 112. When opened (e.g., when in second position 118) (FIGS. 4 and 6), first door 102 and second door 104 may provide access to storage compartment 112, for example, to deploy (e.g., drop) cargo.

Referring to FIGS. 3-6, structure 106 may include at least one actuator 114 operatively coupled to first door 102 and second door 104. Actuator 114 may automatically rotate first door 102 and second door 104 between first position 116 (FIGS. 3 and 5) and second position 118 (FIGS. 4 and 6). Actuator 114 may be any actuation device suitably configured to rotatably move first door 102 relative to structure 106 and second door 104 relative to structure 106. As non-limiting examples, actuator 114 may include an electro-mechanical actuator, a hydraulic actuator, a pneumatic actuator or the like.

As one example, and as illustrated in FIGS. 4 and 6, a first one of actuator 114 may be operatively coupled to first door 102 and be configured to rotate first door 102 in a clockwise direction (e.g., arrow 120) to open first door 102 and rotate first door 102 in a counter-clockwise direction (e.g., arrow 122) to close first door 102. Similarly, a second one of actuator 114 may be operatively coupled to second door 104 and be configured to rotate second door 104 in a counter-clockwise direction (e.g., arrow 124) to open second door 104 and rotate second door 104 in a clockwise direction (e.g., arrow 126) to close second door 104.

While the examples of the disclosed system 100 in FIGS. 3-6 illustrate first door 102 and second door 104 having an outwardly opening direction (e.g., arrow 156), the disclosed system 100 may operate in a substantially similar manner for first door 102 and second door 104 having an inwardly opening direction (not explicitly illustrated).

The degree of rotation of first door 102 and/or second door 104 relative to structure 106 may vary depending on, for example, the type of structure 106, the configuration of system 100, the application of system 100, the type of cargo being deployed and the like. As one non-limiting example, first door 102 and/or second door 104 may rotate up to 90-degrees. As another non-limiting example, first door 102 and/or second door 104 may rotate more than 90-degrees.

Referring to FIG. 1, as one general, non-limiting example, structure 106 may be vehicle 108. As one example, vehicle 108 may be aircraft 110. Aircraft 110 may include any aerospace vehicle including, but not limited to, a fixed-wing aircraft, a rotary-wing aircraft, an unmanned aerial vehicle ("UAV"), a spacecraft and the like. In such an example, first door 102 and second door 104 may be disposed on and, when closed (e.g., in first position 116), form at least a portion of a lower generally horizontal surface of a body (e.g., a fuselage) of aircraft 110. As another example, vehicle 108 may be a marine vehicle (not explicitly illustrated). As yet another example, vehicle 108 may be a land vehicle (not explicitly illustrated). As another general, non-limiting example, structure 106 may be a fixed structure such as a building (not explicitly illustrated).

Figure 2:
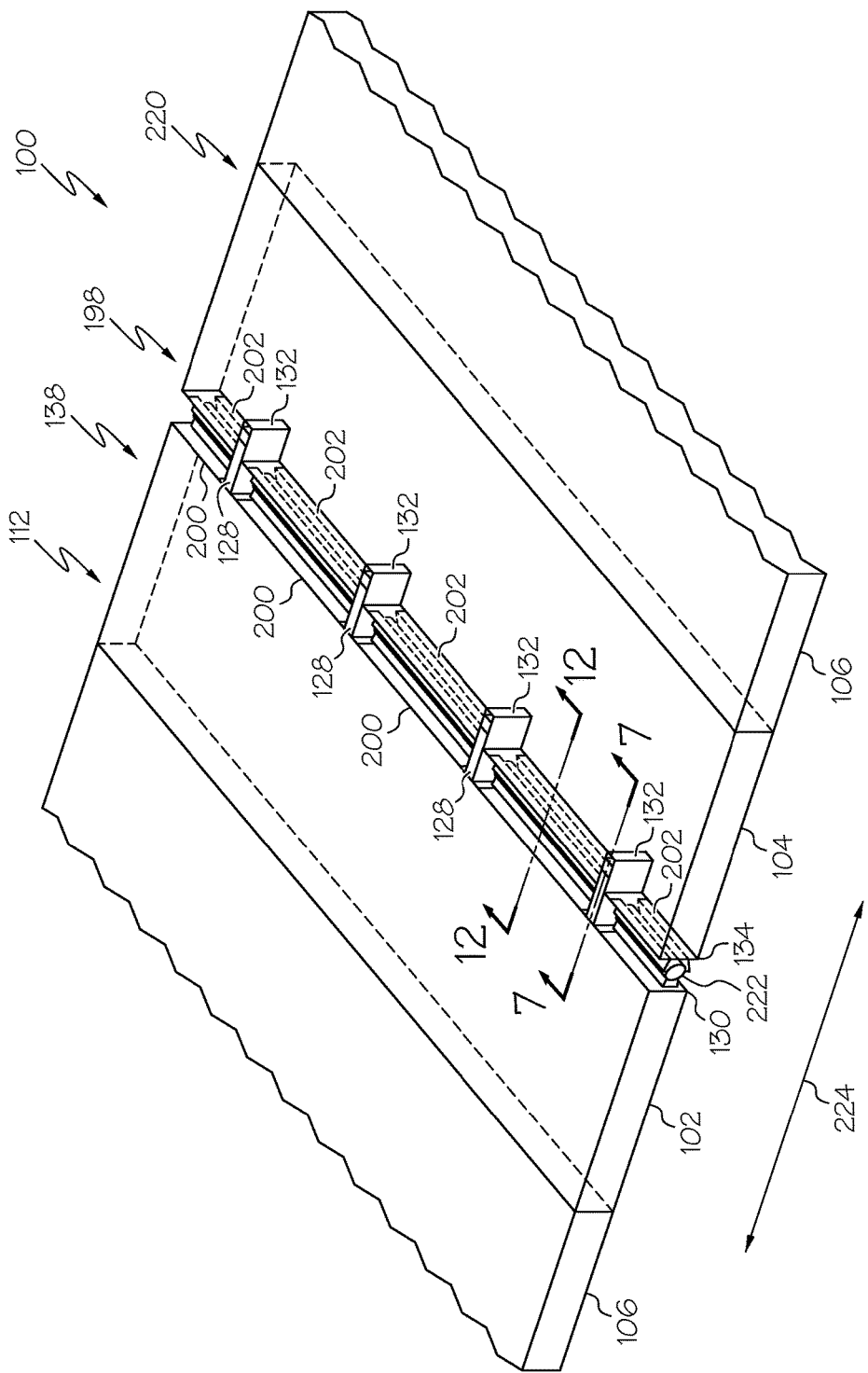
FIG. 2 is a partial schematic perspective view of the door alignment system of FIG. 1.

Referring to FIGS. 2-4, and with reference to FIG. 1, system 100 may include at least one striker assembly 138. Striker assembly 138 may guide first door 102 and second door 104 into positive alignment when moved into first position 116 (FIG. 3). Striker assembly 138 may include striker 128 and striker receptacle 132.

Striker 128 may be coupled to first mating edge 130 of first door 102. Striker receptacle 132 may be coupled to second mating edge 134 of second door 104. Striker 128 may proximate striker receptacle 132 as first door 102 and second door 104 are rotated toward first (e.g., the closed) position 116 (FIG. 3). Striker 128 may matingly engage striker receptacle 132 to guide first door 102 and second door 104 into first position 116.

Referring to FIG. 7, striker 128 may include striker arm 140. Striker arm 140 may project outwardly from first mating edge 130 of first door 102. Striker arm 140 may include first follower surface 142 and second follower surface 144 extending from first follower surface 142 to proximate (e.g., at or near) end 152 of striker arm 140. First follower surface 142 and second follower surface 144 may face the opening direction (e.g., arrow 156), or face away from the closing direction (e.g., arrow 162), of first door 102 and second door 104.

Second follower surface 144 may be disposed at non-zero angle 228 relative to first follower surface 142. Angle 228 may depend on various factors including, for example, the maximum force displacement of first door 102 and second door 104 relative to each other, the rate at which the displacement is enforced and like. As one non-limiting example, angle 228 may be from approximately 8 degrees to approximately 20 degrees to affect a force displacement of approximately ¼ inch to approximately ½ inch. As one specific, non-limiting example, angle 228 may be approximately 18-degrees to affect a force displacement of approximately ½ inch. As another specific, non-limiting example, angle 228 may be approximately 10-degrees to affect a force displacement of approximately ¼ inch.

As one example, first follower surface 142 may be parallel to first plane 146 of first door 102 and second follower surface 144 may be disposed at a non-zero angle relative to first plane 146. As another example, when first door 102 and second door 104 are in the fully closed first position 116 (FIGS. 3 and 7), first follower surface 142 may be parallel to common plane 136 (FIGS. 3 and 5) of first door 102 and second door 104 and second follower surface 144 may be disposed at a non-zero angle relative to common plane 136. For example, second follower surface 144 may extend away from cam 166 (FIG. 7). As illustrated in FIG. 7, when first door 102, second door 104 and common plane 136 are generally horizontal, such as when structure 106 is aircraft 110 (FIG. 1), first follower surface 142 may be horizontal and second follower surface 144 may extend diagonally upwardly from first follower surface 142 and away from cam 166.

Striker arm 140 may include apex 192 at the intersection of first follower surface 142 and second follower surface 144. Apex 192 may be formed by the angled relationship between first follower surface 142 and second follower surface 144.

Striker 128 may include striker roller 150. Striker roller 150 may be rotatably coupled to end 152 of striker arm 140.

Referring still to FIG. 7, striker receptacle 132 may define open region 158 configured to receive a portion of striker arm 140. For example, open region 158 may be suitably configured to receive a portion of striker arm 140 proximate end 152. Striker receptacle 132 may include follower mechanism 154. Follower mechanism 154 may be movably coupled within open region 158. Follower mechanism 154 may engage striker arm 140 to positively align first door 102 and second door 104 and guide first door 102 and second door 104 into first position 116.

Follower mechanism 154 may include lever 160. Lever 160 may include first end 170 and second end 172 opposite first end 170. Lever 160 may be pivotably coupled within open region 158 of striker receptacle 132. As one example, lever 160 may be mechanically coupled, for example, by fastener 164, to second mating edge 134 of second door 104.

Follower mechanism 154 may be biased in first position 188 (FIG. 8). As one example, follower mechanism 154 may include follower spring 180. Follower spring 180 may be operatively coupled to lever 160 to bias follower mechanism 154 in first position 188. As one example, follower spring 180 may include a coiled compression spring wrapped around and coupled to fastener 164 and operatively coupled to lever 160.

Follower mechanism 154 may include cam 166. Cam 166 may include first end 174 and second end 176 opposite first end 174. Cam 166 may be pivotably coupled to lever 160. Cam 166 may engage striker arm 140 to positively align first door 102 and second door 104 and guide first door 102 and second door 104 into first position 116.

As one example, follower mechanism 154 may include at least one linkage 168 coupled between lever 160 and cam 166. For example, linkage 168 may be pivotably coupled between second end 172 of lever 160 and second end 176 of cam 166.

Cam 166 may include cam roller 178. Cam roller 178 may be rotatably coupled to first end 174 of cam 166.

Referring to FIGS. 8-11, and with reference to FIGS. 3, 4 and 7, moving first door 102 and second door 104 from a fully open second position 118 (FIG. 4) to the fully closed first position 116 (FIG. 3) may be referred to herein as a closing operation. During the closing operation, first door 102 may slightly lead second door 104 in rotation such that striker receptacle 132 follows directly behind striker 128 until striker 128 engages striker receptacle 132. For example, second door 104 may follow behind first door 102 by approximately 5-degrees, for example, until first door 102 and second door 104 reach third position 182 (FIG. 8).

As one example, the closing rotation of first door 102 may be approximately 90-degrees and the closing rotation of second door 104 may be approximately 95-degrees. Thus, as one example, first door 102 may have a slightly slower angular displacement relative to second door 104 such that first door 102 reaches third position 182 slightly ahead of second door 104 and first door 102 and second door 104 reach first position 116 at the same time.

Figure 9:
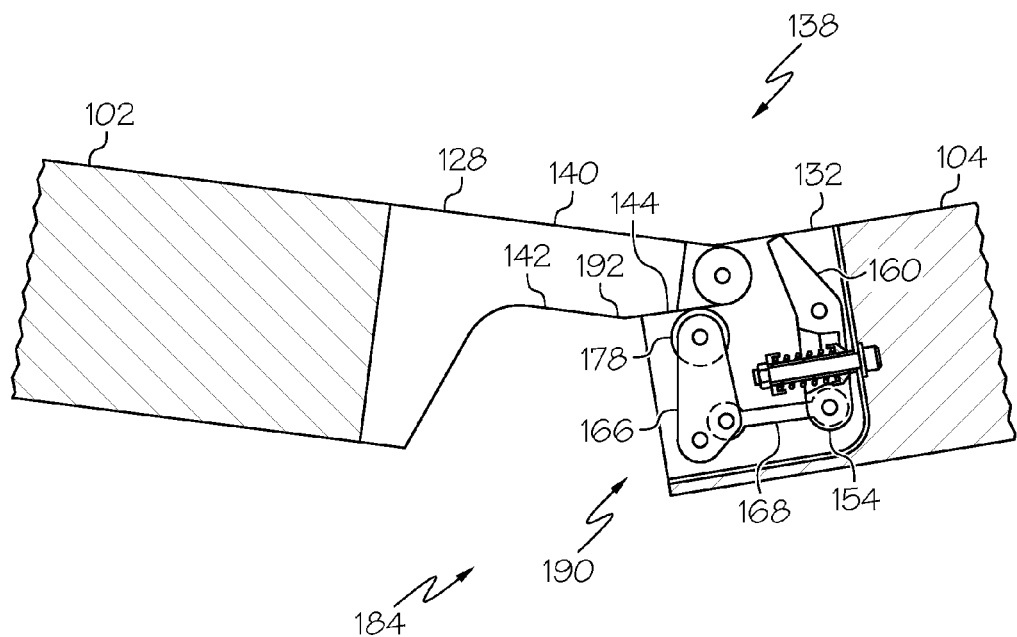
FIG. 9 is a schematic side elevational view, in section, of the striker assembly of FIG. 7 depicting the door assembly moving further into the closed position.
Figure 10:
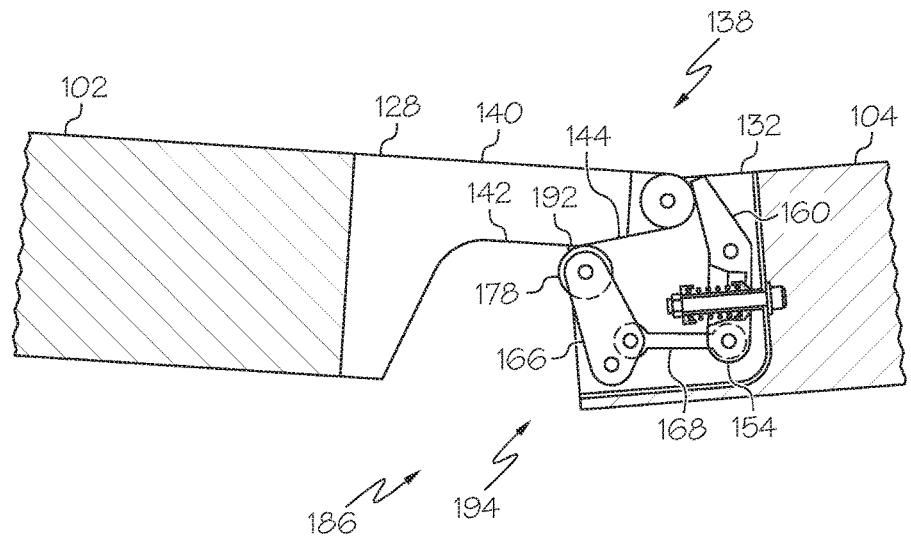
FIG. 10 is a schematic side elevational view, in section, of the striker assembly of FIG. 7 depicting the door assembly moving further into the closed position.
Figure 11:
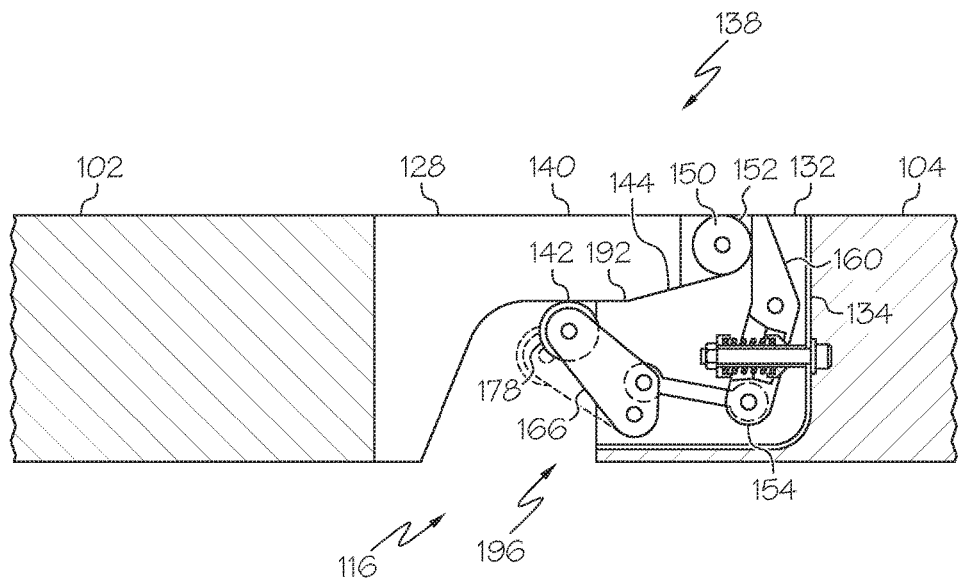
FIG. 11 is a schematic side elevational view, in section, of the striker assembly of FIG. 7 depicting the door assembly in the closed position.

During the closing operation, first door 102 and second door 104 may move through third position 182, as illustrated in FIG. 8. As one example, third position 182 may include approximately 15 percent to approximately 10 percent of the closing rotation of first door 102 and second door 104 prior to being in the fully closed first position 116, as illustrated in FIG. 11. Further during the closing operation, first door 102 and second door 104 may move through fourth position 184, as illustrated in FIG. 9. As one example, fourth position 184 may include approximately 10 percent to approximately 6 percent of the closing rotation of first door 102 and second door 104 prior to being in the fully closed first position 116. Further during the closing operation, first door 102 and second door 104 may move through fifth position 186, as illustrated in FIG. 10. As one example, fifth position 186 may include approximately 6 percent to approximately 3 percent of the closing rotation of first door 102 and second door 104 prior to being in the fully closed first position 116.

Referring to FIG. 8, prior to and during first door 102 and second door 104 moving through third position 182 (e.g., from approximately 0 percent to approximately 90 percent of the closing rotation), follower mechanism 154 may be in first position 188. Follower spring 180 may bias follower mechanism 154 in first position 188. When in first position 188, lever 160 may be positioned (e.g., biased by follower spring 180) outwardly from second mating edge 134 of second door 104 (e.g., toward striker arm 140) and cam 166 may be positioned in an over-center condition.

During the closing operation, and as first door 102 and second door 104 move through third position 182 (e.g., from approximately 85 percent to approximately 90 percent of the closing rotation), striker arm 140 of striker 128 may proximate and be received within open region 158 of striker receptacle 132. End 152 (FIG. 7) of striker arm 140 may engage (e.g., contact) first end 174 (FIG. 7) of cam 166 in the over-center condition. As one example, striker roller 150 may engage cam roller 178.

Referring to FIG. 9, further during the closing operation, and as first door 102 and second door 104 enter fourth position 184, cam 166 may engage second follower surface 144 of striker arm 140. As first door 102 and second door 104 move through fourth position 184 (e.g., from approximately 90 percent to approximately 94 percent of the closing rotation), cam 166 may move along second follower surface 144 toward apex 192 to place follower mechanism 154 in second position 190. As one example, cam roller 178 may engage and move along second follower surface 144.

When in second position 190, lever 160 may remain positioned (e.g., biased by follower spring 180) outwardly from second mating edge 134 of second door 104 (e.g., toward striker arm 140) and cam 166 may remain substantially positioned in the over-center condition.

Referring to FIG. 10, further during the closing operation, and as first door 102 and second door 104 enter fifth position 186, cam 166 may approach apex 192 of striker arm 140. As first door 102 and second door 104 move through fifth position 186 (e.g., from approximately 94 percent to approximately 97 percent of the closing rotation), cam 166 may engage apex 192 to place follower mechanism 154 in third position 194. As cam 166 engages apex 192 and transfers from second follower surface 144 to first follower surface 142 (e.g., at third position 194), cam 166 may force first door 102 away from second door 104 to maintain an appropriate separation between first door 102 and second door 104 and maintain an appropriate alignment of first door 102 and second door 104 until achieving the fully closed first position 116 (FIG. 11).

When in third position 194, lever 160 may remain positioned (e.g., biased by follower spring 180) outwardly from second mating edge 134 of second door 104 (e.g., toward striker arm 140) and cam 166 may begin to rotate relative to lever 160 away from the over-center condition as cam 166 moves across apex 192. For example, cam 166 may rotate about an end of linkage 168 as cam 166 moves along second follower surface 144, over apex 192 and to first follower surface 142.

Referring to FIG. 11, further during the closing operation, and as first door 102 and second door 104 move to first position 116 (e.g., from approximately 97 percent to approximately 100 percent of the closing rotation), cam 166 may continue to move along first follower surface 142 away from apex 192 and end 152 of striker arm 140 (e.g., striker roller 150) may engage lever 160 to place follower mechanism in fourth position 196.

When in fourth position 196, end 152 of striker arm 140 may force lever 160 toward second mating edge 134 of second door 104. Movement of lever 160 by striker arm 140 may cause cam 166 (e.g., cam roller 178) to disengage from first follower surface 142 of striker arm 140 to completely unload follower mechanism 154 (as shown with broken lines).

Disengaging cam 166 from striker arm 140 (e.g., from first follower surface 142) and unloading follower mechanism 154, as illustrated in FIG. 11, may allow for lateral movement (e.g., in the direction of arrow 224) (FIGS. 2 and 3) of first door 102 and/or second door 104 relative to each other. As used herein, lateral movement of first door 102 and/or second door 104 refers to movement parallel to common plane 136 (FIG. 3).

While the examples of striker assembly 138 in FIGS. 2-4 and 7-11 illustrate striker 128 coupled to first door 102 and striker receptacle 132 coupled to second door 104, striker 128 may be coupled to second door 104 and striker receptacle 132 may be coupled to first door 102 with equal benefit.

Referring to FIGS. 2, 5 and 6, and with reference to FIG. 1, system 100 may include at least one rail assembly 198. Rail assembly 198 may maintain alignment of first mating edge 130 of first door 102 and second mating edge 134 of second door 104 when first door 102 and second door 104 are in first position 116 (FIG. 5). Rail assembly 198 may include first rail 200 and second rail 202.

First rail 200 may be coupled to first mating edge 130 of first door 102. Second rail 202 may be coupled to second mating edge 134 of second door 104. First rail 200 may proximate second rail 202 as first door 102 and second door 104 are rotated toward the fully closed first position 116 (FIG. 5). First rail 200 may matingly engage second rail 202 when first door 102 and second door 104 are in first position 116 to maintain coaxial alignment of first door 102 and second door 104 along common plane 136.

Figure 12:
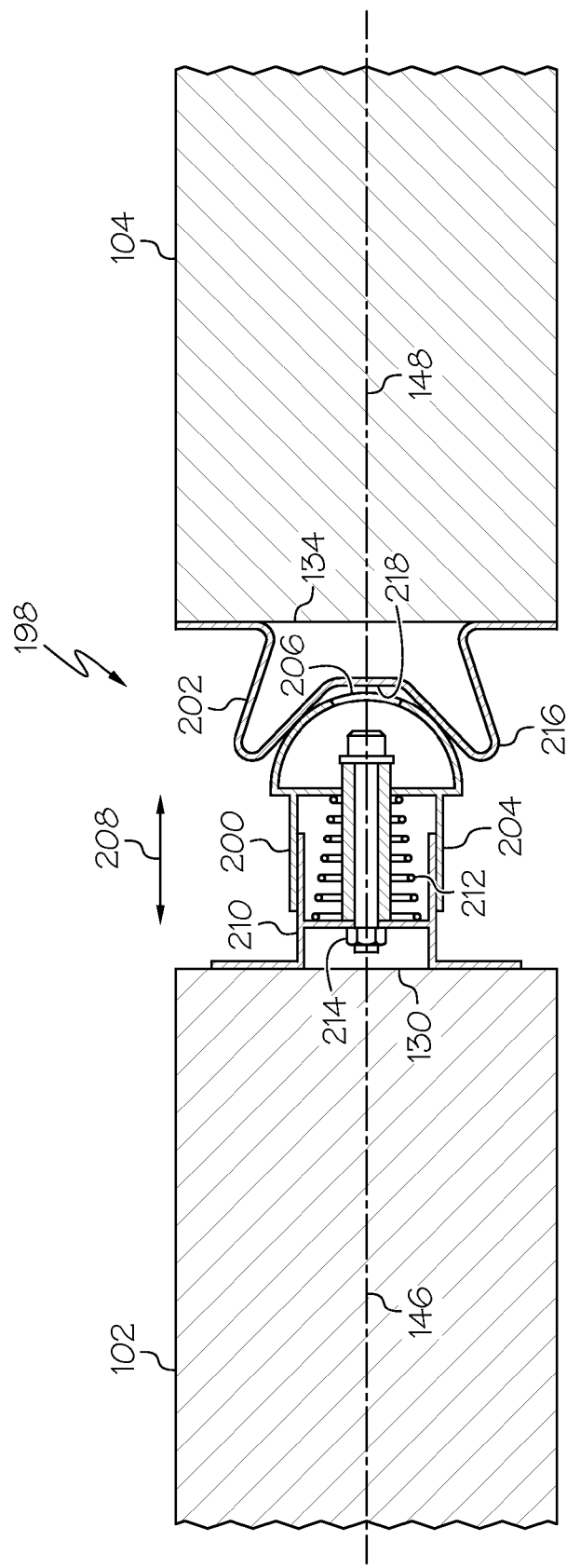
FIG. 12 is a schematic side elevational view, in section, of the rail assembly of FIG. 2.

Referring to FIG. 12, first rail 200 may include convex head 204. Convex head 204 may project outwardly from first mating edge 130 of first door 102. Convex head 204 may include convex mating surface 206. Convex mating surface 206 may include an outwardly curved surface profile. Convex mating surface 206 may at least partially define a surface of convex head 204 opposite first mating edge 130 of first door 102. Thus, first rail 200 may be referred to as a convex rail.

Convex head 204 may be linearly movable relative to first door 102 (e.g., in the direction of arrow 208). As one example, convex head 204 may move inwardly and outwardly (e.g., perpendicularly) relative to first mating edge 130 of first door 102. As one example, first rail 200 may include base 210. Base 210 may be coupled to first mating edge 130 of first door 102. Convex head 204 may be moveably coupled to base 210. As one example, convex head 204 may be mechanically coupled, for example, by fastener 214, to base 210. Convex head 204 may move linearly along fastener 214.

Convex head 204 may be outwardly biased relative to base 210 (or first mating edge 130 of first door 102). As one example, first rail 200 may include rail spring 212. Rail spring 212 may be operatively coupled between convex head 204 and base 210 to bias convex head 204. As one example, rail spring 212 may include a conical coiled compression spring wrapped around fastener 214 and operatively coupled between convex head 204 and base 210.

Referring still to FIG. 12, second rail 202 may include concave head 216. Concave head 216 may project outwardly from second mating edge 134 of second door 104. Concave head 216 may include concave mating surface 218. Concave mating surface 218 may include an inwardly curved surface profile. Concave mating surface 218 may at least partially define a surface of concave head 216 opposite second mating edge 134 of second door 104. Thus, second rail 202 may be referred to as a concave rail.

Figure 14:
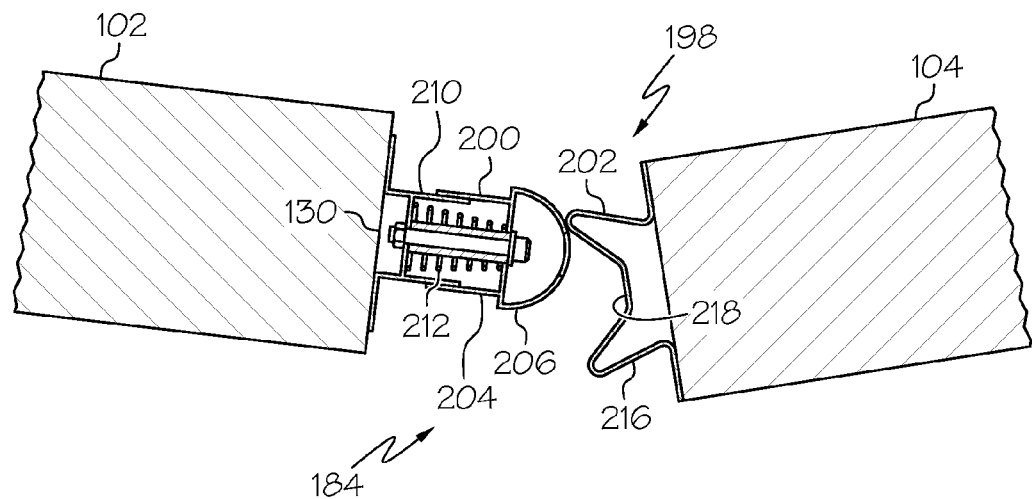
FIG. 14 is a schematic side elevational view, in section, of the rail assembly of FIG. 12 depicting the door assembly moving further into the closed position.
Figure 15:
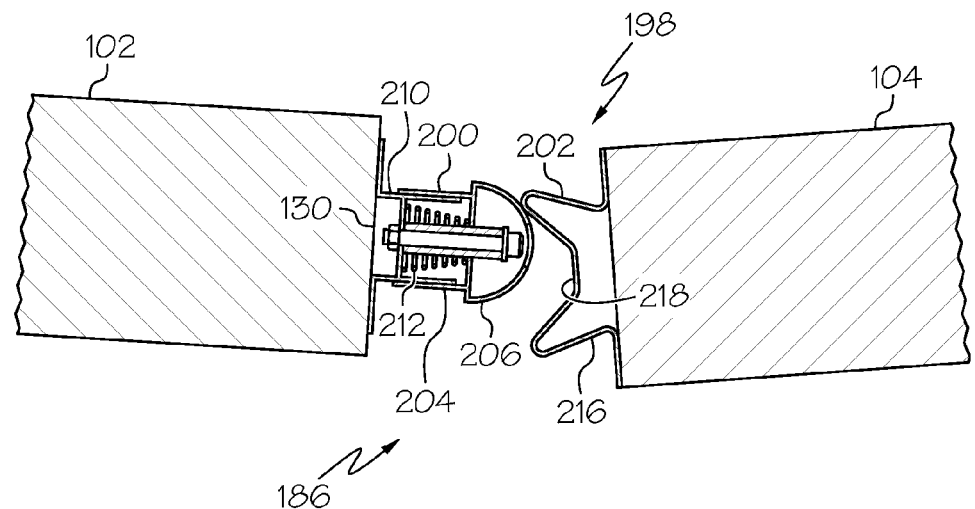
FIG. 15 is a schematic side elevational view, in section, of the rail assembly of FIG. 12 depicting the door assembly moving further into the closed position.
Figure 16:
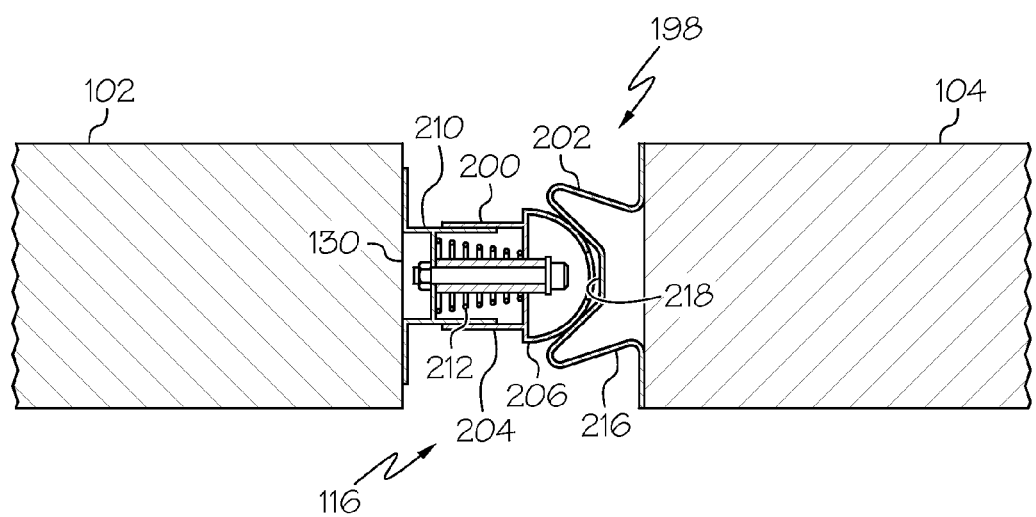
FIG. 16 is a schematic side elevational view, in section, of the rail assembly of FIG. 12 depicting the door assembly in the closed position.

Referring to FIGS. 13-16, and with reference to FIGS. 5, 6 and 8, as described herein above, the closing operation may move (e.g., rotate) first door 102 and second door 104 from fully opened second position 118 (FIG. 6) to the fully closed first position 116 (FIG. 16). During the closing operation, first door 102 may slightly lead second door 104 in rotation such that concave head 216 follows directly behind convex head 204 until convex head 204 engages concave head 216.

Figure 13:
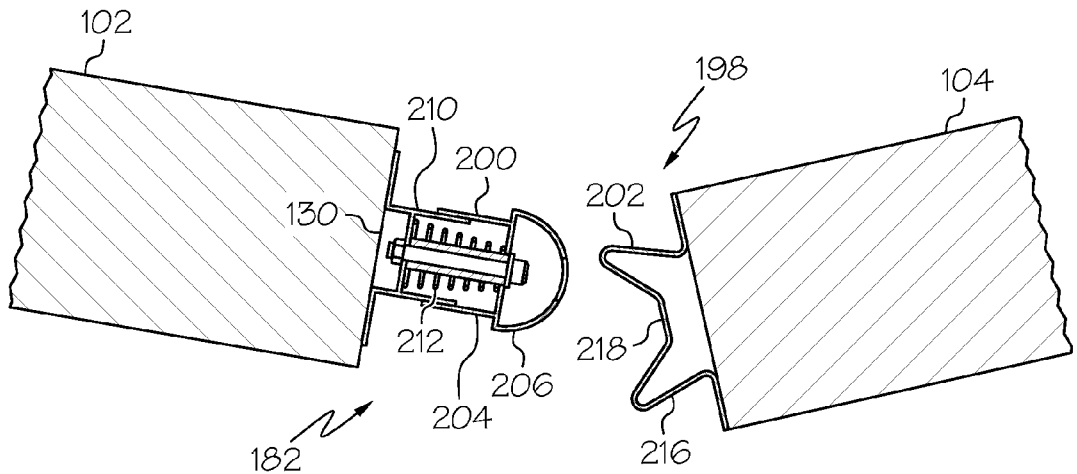
FIG. 13 is a schematic side elevational view, in section, of the rail assembly of FIG. 12 depicting the door assembly moving into the closed position.

During the closing operation, first door 102 and second door 104 may move through third position 182, as illustrated in FIG. 13. As one example, third position 182 may include approximately 15 percent to approximately 10 percent of the closing rotation of first door 102 and second door 104 prior to being in the fully closed first position 116, as illustrated in FIG. 16. Further during the closing operation, first door 102 and second door 104 may move through fourth position 184, as illustrated in FIG. 14. As one example, fourth position 184 may include approximately 10 percent to approximately 6 percent of the closing rotation of first door 102 and second door 104 prior to being in the fully closed first position 116. Further during the closing operation, first door 102 and second door 104 may move through fifth position 186, as illustrated in FIG. 15. As one example, fifth position 186 may include approximately 6 percent to approximately 3 percent of the closing rotation of first door 102 and second door 104 prior to being in the fully closed first position 116.

Referring to FIG. 13, prior to and during first door 102 and second door 104 moving through third position 182 (e.g., from approximately 0 percent to approximately 90 percent of the closing rotation), convex head 204 may be outwardly biased relative to first mating edge 130 of first door 102 (or base 210). During the closing operation, and as first door 102 and second door 104 move through third position (e.g., from approximately 85 percent to approximately 90 percent of the closing rotation), convex head 204 may proximate concave head 216.

Referring to FIG. 14, further during the closing operation, and as first door 102 and second door 104 enter fourth position 184, convex head 204 may begin to engage concave head 216. For example, a portion of convex mating surface 206 may contact and cooperate with a portion of concave mating surface 218. During initial engagement of convex head 204 and concave head 216, contact between convex mating surface 206 and concave mating surface 218 may compress rail spring 212 and linearly move convex head 204 toward first mating edge 130 of first door 102.

Referring to FIG. 15, further during the closing operation, and as first door 102 and second door 104 move through fifth position 186 (e.g., from approximately 94 percent to approximately 97 percent of the closing rotation), convex head 204 may further engage and be partially received within concave head 216. During further engagement of convex head 204 and concave head 216, contact between convex mating surface 206 and concave mating surface 218 may further compress rail spring 212 and linearly move convex head 204 toward first mating edge 130 of first door 102.

Referring to FIG. 16, further during the closing operation, and as first door 102 and second door 104 move to first position 116 (e.g., from approximately 97 percent to approximately 100 percent of the closing rotation), convex head 204 may further engage concave head 216 until convex head 204 is fully received within and mated with concave head 216.

Upon full engagement of convex head 204 and concave head 216 (e.g., when convex head 204 is fully received within concave head 216), rail spring 212 may apply on outward force to convex head 204 to maintain engagement between convex mating surface 206 and concave mating surface 218. A spring force applied to convex head 204 by rail spring 212 may allow for lateral movement (e.g., in the direction of arrow 224) (FIG. 5) of first door 102 and/or second door 104 relative to each other. The spring force may be sufficient to maintain a seal between first door 102 and second door 104 along joint 222 (FIG. 2) formed between first rail 200 (e.g., convex head 204) and second door 104 (e.g., concave head 216). As one example, spring force may be at least 1 lb/in$^2$.

Concave mating surface 218 may be suitably shaped to correspond to convex mating surface 206 such that convex head 204 may be received within and matingly engage concave head 216. Engagement between convex mating surface 206 and concave mating surface 218 may maintain first door 102 and second door 104 in coaxial alignment along common plane 136 (FIG. 5).

Engagement between convex head 204 (e.g., convex mating surface 206) and concave head 216 (e.g., concave mating surface 218) may also prevent non-lateral movement of first door 102 and/or second door 104 relative to each other. As used herein, non-lateral movement refers to any out-of-plane movement (e.g., in the direction of arrow 226) (FIG. 5) of first door 102 and/or second door 104 relative to each other. As used herein, out-of-plane movement refers to movement in a direction not parallel to common plane 136 (FIG. 5).

While the examples of rail assembly 198 in FIGS. 2, 5, 6 and 12-16 illustrate the convex first rail 200 coupled to first door 102 and the concave second rail 202 coupled to second door 104, the convex first rail 200 may be coupled to second door 104 and the concave second door 202 may be coupled to first door 102 with equal benefit.

Referring to FIGS. 8-16, and with reference to FIGS. 3, 4 and 7, moving first door 102 and second door 104 from a fully closed first position 116 (FIG. 3) to the fully opened second position 118 (FIG. 4) may be referred to herein as an opening operation. During the opening operation, striker assembly 138 and rail assembly 198 each may operate in substantially the reverse order as described above and illustrated in FIGS. 8-16.

Referring to FIG. 2, as one example, system 100 may include both striker assembly 138 and rail assembly 198 operating in combination. The combination of striker assembly 138 and rail assembly 198 may positively align first mating edge 130 of first door 102 and second mating edge 134 of second door 104 during movement into first position 116 and, once engaged, maintain proper alignment of first mating edge 130 of first door 102 and second mating edge 134 of second door 104. Further, the combination of striker assembly 138 and rail assembly 198 may allow for in-plane (e.g., along common plane 136) (FIGS. 3 and 5) lateral movement (e.g., in the direction of arrow 224) of first door 102 and second door 104 and prevent out-of-plane movement of first door 102 and second door 104.

Referring still to FIG. 2, as one example, system 100 may include a plurality of striker assemblies 138 and a plurality of rail assemblies 198. The total number of striker assemblies 138 and the number of rail assemblies 198 may depend upon, for example, the size of first door 102 and second door 104.

As one example, a plurality of strikers 128 and a plurality of first (e.g., convex) rails 200 may be coupled to first mating edge 130 of first door 102. A plurality of striker receptacles 132 and a plurality of second (e.g., concave) rails 202 may be coupled to second mating edge 134 of second door 104. The plurality of strikers 128 may be spaced apart along first mating edge 130 of first door 102. As one example, the plurality of strikers 128 may be equally spaced apart along first mating edge 130 of first door 102. The plurality of first rails 200 may extend substantially the entire length of first mating edge 130 of first door 102. As one example, one first rail 200 of the plurality of first rails 200 may extend between pairs of adjacent spaced apart strikers 128 of the plurality of strikers 128. Similarly, the plurality of striker receptacles 132 may be spaced apart along second mating edge 134 of second door 104. As one example, the plurality of striker receptacles 132 may be equally spaced apart along second mating edge 134 of second door 104 and positioned opposite the plurality of strikers 128. The plurality of second rails 202 may extend substantially the entire length of second mating edge 134 of second door 104 and positioned opposite the plurality of first rails 200. As one example, one second rail 202 of the plurality of second rails 202 may extend between pairs of adjacent spaced apart striker receptacles 132 of the plurality of striker receptacles 132.

While the example of system 100 in FIG. 2 illustrates striker 128 (e.g., plurality of strikers 128) and first (e.g., convex) rail 200 (e.g., plurality of first rails 200) coupled to first mating edge 130 of first door 102 and striker receptacle 132 (e.g., plurality of striker receptacles 132) and second (e.g., concave) rail 202 (e.g., plurality of second rails 202) coupled to second mating edge 134 of second door 104, this configuration may vary. As one example, striker 128 (e.g., plurality of strikers 128) and second (e.g., concave) rail 202 (e.g., plurality of second rails 202) may be coupled to first mating edge 130 of first door 102 and striker receptacle 132 (e.g., plurality of striker receptacles 132) and first (e.g., convex) rail 200 (e.g., plurality of first rails 200) may be coupled to second mating edge 134 of second door 104.

Accordingly, striker assembly 138 (e.g., each one of the plurality of striker assemblies 138) of system 100 may provide a ramped guide surface (e.g., second follower surface 144 of striker arm 140) that can be tailored to optimize relative door-to-door edge positioning and sequencing as the movable doors (e.g., first door 102 and second door 104) are mechanically driven to the fully closed position (e.g., first position 116) (FIG. 11). As the movable doors are driven to the closed position, follower mechanism 154 of striker assembly 138 may be moved to an "unloaded" position (e.g., fourth position 196) (FIG. 11) to prevent any subsequent, adverse door-to-door joint separation due to lateral movement of the doors.

Rail assembly 198 (e.g., engagement between the convex first rail 200 and concave second rail 202) may effectively provide a continuous two-directional (e.g., out-of-plane) door-to-door edge alignment along the full length of the door joint with the movable doors in the closed position (e.g., first position 116) (FIG. 16). With the doors in the closed position, rail assembly 198 may provide for appreciable lateral movement of each individual movable door (e.g., first door 102 and second door 104) while still maintaining positive door-to-door edge alignment.

Referring to FIG. 17, and with reference to FIGS. 1-16, one embodiment of method, generally designated 300, for aligning first mating edge 130 of first door 102 and second mating edge 134 of second door 104 when first door 102 and second door 104 are moved into first (e.g., closed) position 116, is disclosed. Modifications, additions, or omissions may be made to method 300 without departing from the scope of the present disclosure. Method 300 may include more, fewer, or other steps. Additionally, steps may be performed in any suitable order.

Referring to FIG. 17, and with reference to FIGS. 3-6, method 300 may include the step of moving first door 102 and second door 104 from second (e.g., opened) position 118 (FIGS. 4 and 6) toward first (closed) position 116 (FIGS. 3 and 5), as shown at block 302.

Referring to FIG. 17, and with reference to FIGS. 7 and 8, method 300 may include the step of engaging second follower surface 144 of striker arm 140 projecting outwardly from first mating edge 130 of first door 102 with cam 166 of follower mechanism 154 movably coupled to second mating edge 134 of second door 104, as shown at block 304.

Referring to FIG. 17, and with reference to FIGS. 7 and 9, method 300 may include the step of positively aligning first mating edge 130 of first door 102 and second mating edge 134 of second door 104 by moving cam 166 along second follower surface 144 to first follower surface 142 disposed at a non-zero angle relative to second follower surface 144, as shown at block 306.

Referring to FIG. 17, and with reference to FIGS. 7 and 10, method 300 may include the step of separating first mating edge 130 of first door 102 from second mating edge 134 of second door 104 by engaging cam 166 to apex 192 of striker arm 140 formed by an intersection of second follower surface 144 and first follower surface 142, as shown at block 308.

Referring to FIG. 17, and with reference to FIGS. 7 and 11, method 300 may include the step of further aligning first mating edge 130 of first door 102 and second mating edge 134 of second door 104 by moving cam 166 along first follower surface 142 until first door 102 and second door 104 are in closed first position 116, as shown at block 310.

Referring to FIG. 17, and with reference to FIGS. 12-16, method 300 may include the step of maintaining alignment of first mating edge 130 of first door 102 and second mating edge 134 of second door 104 by matingly engaging convex first rail 200 coupled to first mating edge 130 of first door 102 with concave second rail 202 coupled to second mating edge 134 of second door 104 when first door 102 and second door 104 are in closed first position 116, as shown at block 312.

Referring to FIG. 17, and with reference to FIGS. 7 and 11, method 300 may include the step of disengaging cam 166 from first follower surface 142 of striker arm 140, as shown at block 314.

Referring to FIG. 17, and with reference to FIGS. 2, 3 and 5, method 300 may include the step of allowing lateral movement (e.g., in the direction of arrow 224) of at least one of first door 102 and second door 104, as shown at block 316.

Referring to FIG. 17, and with reference to FIG. 5, method 300 may include the step of preventing non-lateral movement (e.g., in the direction of arrow 226) of first door 102 and second door 104, as shown at block 318.

Examples of the present disclosure may be described in the context of aircraft manufacturing and service method 1100 as shown in FIG. 18 and aircraft 1200 as shown in FIG. 19. Aircraft 1200 may be one example of vehicle 108 illustrated in FIG. 1.

During pre-production, the illustrative method 1100 may include specification and design, as shown at block 1102, of aircraft 1200 and material procurement, as shown at block 1104. During production, component and subassembly manufacturing, as shown at block 1106, and system integration, as shown at block 1108, of aircraft 1200 may take place. Thereafter, aircraft 1200 may go through certification and delivery, as shown block 1110, to be placed in service, as shown at block 1112. While in service, aircraft 1200 may be scheduled for routine maintenance and service, as shown at block 1114. Routine maintenance and service may include modification, reconfiguration, refurbishment, etc. of one or more systems of aircraft 1200.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 19, aircraft 1200 produced by illustrative method 1100 may include airframe 1202 with a plurality of high-level systems 1204 and interior 1206. Examples of high-level systems 1204 include one or more of propulsion system 1208, electrical system 1210, hydraulic system 1212 and environmental system 1214. Any number of other systems may be included. Although an aerospace example is shown, the principles disclosed herein may be applied to other industries, such as the automotive industry, the marine industry, the construction industry or the like.

The systems, apparatus and methods shown or described herein may be employed during any one or more of the stages of the manufacturing and service method 1100. For example, components or subassemblies corresponding to component and subassembly manufacturing (block 1106) may be fabricated or manufactured in a manner similar to components or subassemblies produced while aircraft 1200 is in service (block 1112). Also, one or more examples of the apparatus, systems and methods, or combination thereof may be utilized during production stages (blocks 1108 and 1110), for example, by providing door alignment systems 100 to cargo doors of aircraft 1200. Similarly, one or more examples of the apparatus and methods, or a combination thereof, may be utilized, for example and without limitation, while aircraft 1200 is in service (block 1112) and during maintenance and service stage (block 1114).

Although various embodiments of the disclosed systems and methods have been shown and described, modifications may occur to those skilled in the art upon reading the specification. The present application includes such modifications and is limited only by the scope of the claims.

What is claimed is:

1. A door alignment system comprising:
a door assembly comprising:
   a first door comprising a first mating edge; and
   a second door comprising a second mating edge, wherein said first door and said second door are movable between an open position and a closed position;
a striker assembly configured to align said first mating edge and said second mating edge when said first door and said second door are moved into said closed position, said striker assembly comprising:
   a striker comprising a striker arm coupled to and projecting outwardly from said first mating edge;
   a striker receptacle coupled to said second mating edge and comprising an open region, said open region is configured to receive said striker when said first door and said second door are moved into said closed position; and
   a movable follower mechanism coupled to said striker receptacle within said open region, as said first door and said second door move into said closed position, said follower mechanism engages said striker arm to guide said first door relative to said second door and then disengages said striker arm when said first door and said second door are in said closed position; and
a rail assembly configured to maintain alignment of said first mating edge and said second mating edge when said first door and said second door are in said closed position, said rail assembly comprising:
   a convex first rail coupled to said first mating edge; and
   a concave second rail coupled to said second mating edge opposite said convex first rail, said concave second rail is configured to engage said convex first rail when said first door and said second door are moved into said closed position.

2. The system of claim 1 wherein:
said striker arm comprises a first follower surface and a second follower surface extending from said first follower surface to an end of said striker arm, and
said follower mechanism comprises a cam engaged with and movable along said second follower surface to said first follower surface, as said first door and said second door are moved from said open position to said closed position, to guide said first mating edge of said first door and said second mating edge of said second door into alignment as said first door and said second door are moved into said closed position.

3. The system of claim 2 wherein:
said striker arm further comprises an apex defined by an intersection of said first follower surface and second follower surface, and
said follower mechanism forces said first door away from said second door when said cam engages said apex.

4. The system of claim 2 wherein:
said follower mechanism further comprises a lever coupled to said cam, and
said end of said striker arm engages said lever to disengage said cam from said first follower surface as said first door and said second door are moved into said closed position.

5. The system of claim 4 wherein:
said striker further comprises a striker roller rotationally coupled with said end of said striker arm; and
said striker roller is configured to engage said cam before said cam engages said second follower surface as said first door and said second door are moved from said open position into said closed position.

6. The system of claim 1 wherein said striker assembly is configured to allow lateral movement of said first door relative to said second door when said first door and said second door are in said closed position.

7. The system of claim 1 wherein:
said convex first rail comprises a convex head projecting outwardly from said first mating edge of said first door,
said concave second rail comprises a concave head projecting outwardly from said second mating edge of said second door, and
said concave head is configured to engageably receive said convex head when said first door and said second door are in said closed position.

8. The system of claim 7 wherein:
said convex head is linearly movable relative to said first mating edge of said first door, and
said convex head is biased outwardly from said first mating edge of said first door.

9. The system of claim 8 wherein:
said convex first rail further comprises a rail spring operatively coupled to said convex head, and
said rail spring applies a spring force to said convex head to maintain engagement between said convex head and said concave head when said first door and said second door are in said closed position.

10. The system of claim 1 wherein said rail assembly is configured to allow lateral movement of said first door relative to said second door when said first door and said second door are in said closed position.

11. The system of claim 1 wherein:
with said first door and said second door in said closed position, said first door and said second door define a common plane; and
said rail assembly is configured to prevent movement of said first door and said second door out of said plane when said first door and said second door are in said closed position.

12. The system of claim 1 wherein said striker assembly comprises a plurality of said striker assemblies.

13. The system of claim 12 wherein said plurality of said striker assemblies comprises:
a plurality of said strikers spaced apart along said first mating edge of said first door;
a plurality of said striker receptacles spaced apart along said second mating edge of said second door, said plurality of said striker receptacles is located opposite said plurality of said strikers when said first door and said second door are in said closed position; and
a plurality of said follower mechanisms coupled to said plurality of said striker receptacles.

14. The system of claim 13 wherein said rail assembly comprises a plurality of said rail assemblies.

15. The system of claim 14 wherein said plurality of said rail assemblies comprises:
a plurality of said convex first rails coupled to said first mating edge of said first door, one of said plurality of said convex first rails being located between an adjacent pair of said plurality of said strikers; and
a plurality of said concave second rails coupled to said second mating edge of said second door, one of said plurality of said concave second rails being located between an adjacent pair of said plurality of said striker receptacles.

16. The system of claim 1 wherein said first door is rotatably positioned approximately 5-degrees in front of said second door when said first door and said second door move from said open position to said closed position.

17. An aircraft comprising:
a body comprising a storage compartment;
a first door rotatably coupled to said body and comprising a first mating edge;
a second door rotatably coupled to said body and comprising a second mating edge, said first door and said second door are configured to rotationally move between an open position and a closed position;
a striker assembly configured to align said first mating edge and said second mating edge when said first door and said second door are moved into said closed position, said striker assembly comprising:
   a striker comprising a striker arm projecting outwardly from said first mating edge;
   a striker receptacle coupled to said second mating edge and comprising an open region, said open region is configured to receive said striker when said first door and said second door move into said closed position; and
   a movable follower mechanism coupled to said striker receptacle within said open region, as said first door and said second door move into said closed position, said follower mechanism engages said striker arm to guide said first door relative to said second door and then disengages said striker arm when said first door and said second door are in said closed position; and
a rail assembly configured to maintain alignment of said first mating edge and said second mating edge when said first door and said second door are in said closed position, said rail assembly comprising:
   a convex first rail coupled to said first mating edge; and
   a concave second rail coupled to said second mating edge opposite said convex first rail, said concave second rail is configured to engage said convex first rail when said first door and said second door move into said closed position.

18. The aircraft of claim 17 wherein:
said striker arm comprises a first follower surface and a second follower surface extending from said first follower surface to an end of said striker arm;
said follower mechanism comprises:
   a cam configured to engage and move along said second follower surface to said first follower surface as said first door and said second door are moved from said open position to said closed position; and
   a lever coupled to said cam; and
said end of said striker arm is configured to engage said lever to disengage said cam from said first follower surface as said first door and said second door are moved into said closed position.

19. The aircraft of claim 17 wherein said striker assembly is configured to allow lateral movement of said first door relative to said second door when said first door and said second door are in said closed position.

20. The aircraft of claim 17 wherein said rail assembly is configured to allow lateral movement of said first door relative to said second door when said first door and said second door are in said closed position.

* * * * *